US010796421B2

(12) United States Patent
Safdarnejad et al.

(10) Patent No.: US 10,796,421 B2
(45) Date of Patent: *Oct. 6, 2020

(54) CREATING SELECTIVE VIRTUAL LONG-EXPOSURE IMAGES

(71) Applicant: ADOBE INC., San Jose, CA (US)

(72) Inventors: Seyed Morteza Safdarnejad, San Jose, CA (US); Sarah Aye Kong, Cupertino, CA (US); Gregg Darryl Wilensky, San Francisco, CA (US); Chih-Yao Hsieh, San Jose, CA (US)

(*) Notice: Subject to any disclaimer, the term of this patent is extended or adjusted under 35 U.S.C. 154(b) by 341 days.

This patent is subject to a terminal disclaimer.

(21) Appl. No.: 15/895,695

(22) Filed: Feb. 13, 2018

(65) Prior Publication Data

US 2019/0251683 A1    Aug. 15, 2019

(51) Int. Cl.
| | |
|---|---|
| G06K 9/00 | (2006.01) |
| G06T 5/50 | (2006.01) |
| G06T 5/00 | (2006.01) |
| H04N 5/232 | (2006.01) |
| H04N 5/235 | (2006.01) |

(52) U.S. Cl.
CPC ............... *G06T 5/50* (2013.01); *G06T 5/002* (2013.01); *H04N 5/23293* (2013.01); *G06T 2207/20182* (2013.01); *G06T 2207/20221* (2013.01); *H04N 5/2353* (2013.01)

(58) Field of Classification Search
CPC . G06T 5/50; G06T 5/002; G06T 2207/20182; G06T 2207/20221; H04N 5/23293; H04N 5/2353
USPC ........................................................ 382/294
See application file for complete search history.

(56) References Cited

U.S. PATENT DOCUMENTS

| | | | |
|---|---|---|---|
| 9,077,913 B2* | 7/2015 | Hasinhoff | H04N 5/265 |
| 9,131,201 B1* | 9/2015 | Geiss | H04N 5/235 |
| 10,127,632 B1 | 11/2018 | Burke et al. | |
| 2004/0001071 A1 | 1/2004 | Noyle | |
| 2014/0111662 A1 | 4/2014 | Mashiah | |

(Continued)

OTHER PUBLICATIONS

Salamon, Nestor Z., Marcel Lancelle, and Elmar Eisemann. "Computational light painting using a virtual exposure." Computer Graphics Forum. vol. 36. No. 2. 2017. (Year: 2017).*

(Continued)

*Primary Examiner* — Jonathan S Lee
(74) *Attorney, Agent, or Firm* — Shook, Hardy & Bacon L.L.P.

(57) ABSTRACT

Embodiments of the present invention are directed to facilitating images with selective application of the long-exposure effect. In accordance with some embodiments of the present invention, virtual long-exposure image comprising a plurality of aligned frames is provided and a selection of a region of pixels in the virtual long-exposure image is received. The virtual long-exposure image is combined with one of the frames forming the virtual long-exposure image to create a selective virtual long-exposure image. The selective virtual long-exposure image comprises a visible portion of the original virtual long-exposure image and a visible portion of the individual frame that corresponds to the selected region of pixels. Additional frames may be combined with the virtual long-exposure image to create a plurality of selective virtual long-exposure image options, and the user may select one for continued use or for saving.

20 Claims, 14 Drawing Sheets

(56) References Cited

U.S. PATENT DOCUMENTS

2015/0346969 A1 12/2015 Strabbing et al.
2019/0251729 A1* 8/2019 Safdarnejad ............ G06T 13/40

OTHER PUBLICATIONS

Willett, Nora S., et al. "A mixed-initiative interface for animating static pictures." Proceedings of the 31st Annual ACM Symposium on User Interface Software and Technology. 2018. (Year: 2018).*
Bai, Jiamin, Aseem Agarwala, Maneesh Agrawala, and Ravi Ramamoorthi. "Selectively de-animating video." ACM Trans. Graph. 31, No. 4 (2012): 66-1.
Non-Final Office Action dated Apr. 18, 2019 in U.S. Appl. No. 15/895,687, 25 pages.
Notice of Allowance dated Oct. 31, 2019 in U.S. Appl. No. 15/895,687, 11 pages.
Gadget Hacks: How to Take Long Exposure Photos on Your iPhone iOS, https://ios.gadgethacks.com/how-to/take-long-exposure-photos-your-iphone-ios-11-0177938/, 5 pages.
Ron Martinsen's Photography Blog: Review—Flixel Cinemagraph—Motion Photos, http://www.ronmartblog.com/2015/02/review-flixel-cinemagraph-pro.html, 8 pages.

* cited by examiner

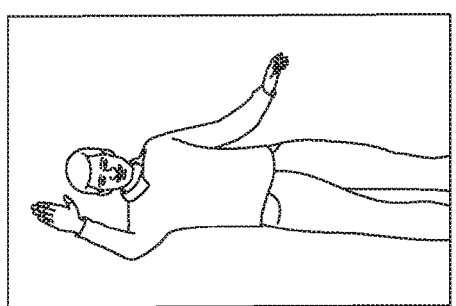
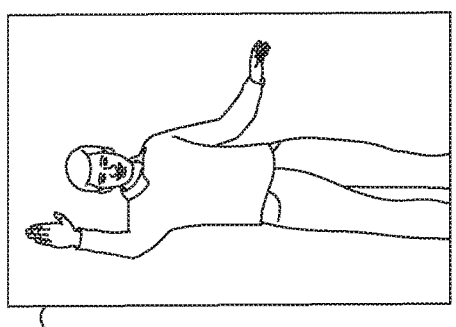
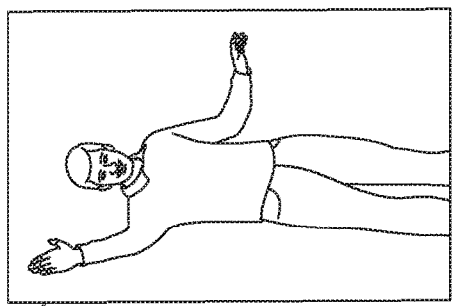
FIG. 3A
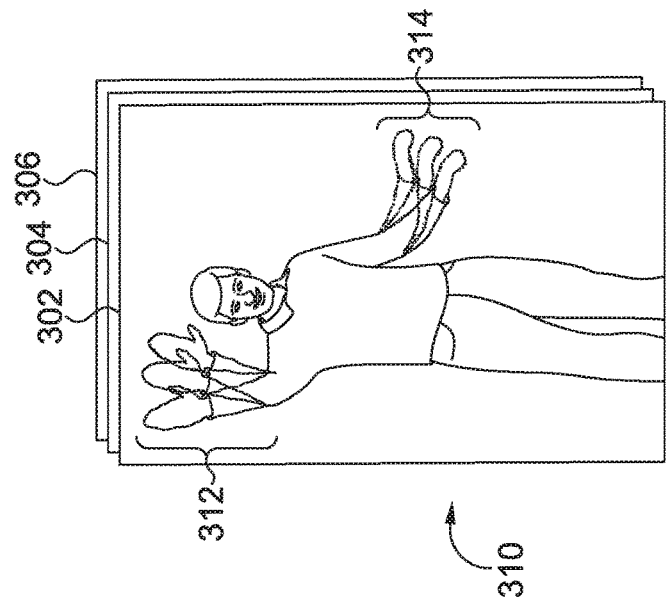
FIG. 3B

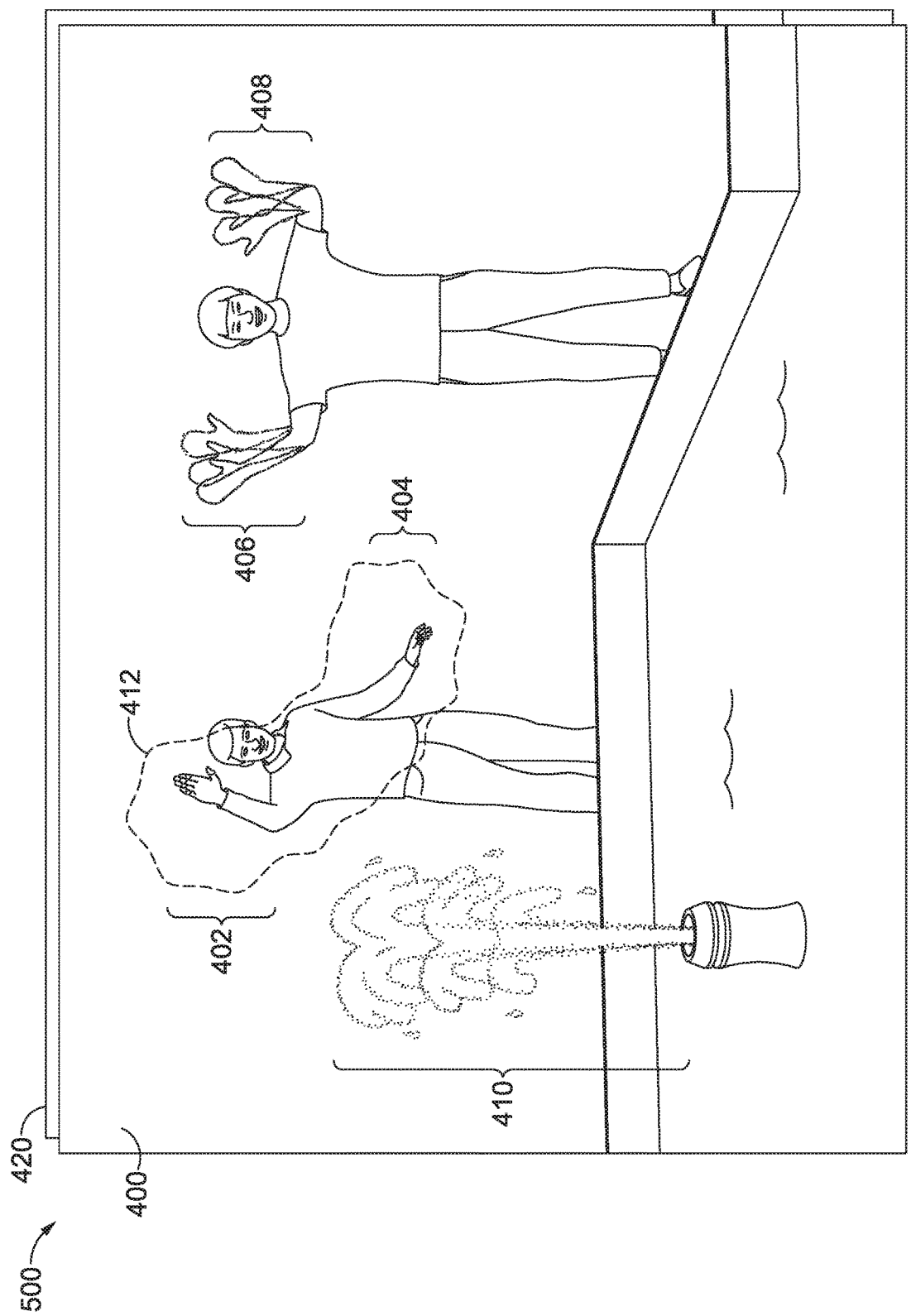

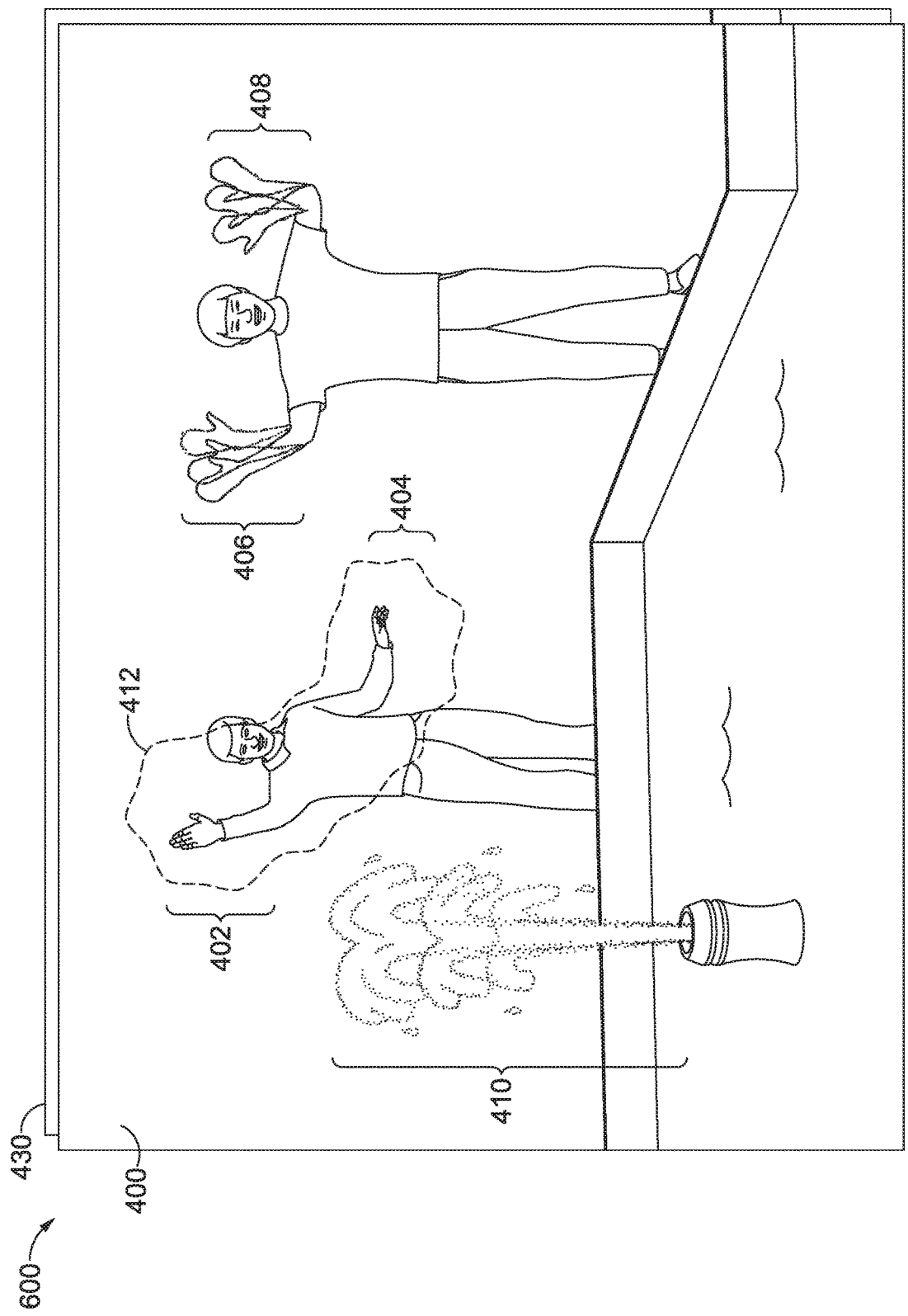

CREATING SELECTIVE VIRTUAL LONG-EXPOSURE IMAGES

CROSS-REFERENCE TO RELATED APPLICATIONS

This application is related in subject matter to U.S. Nonprovisional application Ser. No. 15/895 687, entitled "Creating Cinemagraphs with Virtual Long-Exposure Images," filed Feb. 13, 2018 and issued as U.S. Pat. No. 10,573,052 on Feb. 25, 2020, which is herein incorporated by reference in its entirety.

BACKGROUND

Long-exposure photography utilizes a long-duration shutter speed to achieve imagery with sharp representation of stationary regions and a blurred effect of moving regions. Traditionally, a tripod has been needed to keep the camera stationary for the long duration needed to achieve a long-exposure photograph. Virtual long-exposure techniques attempt to create the same visual effect through alignment and aggregation of a stack of images or frames from a video. While conventional virtual long-exposure techniques remove the need for a completely stationary camera and, therefore, the need for a tripod, these conventional techniques indiscriminately blur any region with movement. For instance, a photographer may be shooting images of a moving waterfall nearby a group of trees with the desire to show the waterfall in motion; however, the virtual long-exposure image may also result in a blurred effect to the moving leaves, which may not be the desired result for the image.

SUMMARY

Aspects of the present disclosure relate to creating virtual long-exposure (LE) images while providing a user control of which regions in the image will have the long-exposure effect and which regions appear as a single still image. Generally, a virtual LE image is provided from a stack of frames. Through aggregation and alignment of the frames, the long-exposure effect is achieved in which all elements moving between frames appear blurry, providing a trailing movement appearance. A user can create an image with more selective use of the long-exposure effect by selecting a region of pixels to which the long-exposure effect is removed and replaced with a sharper appearance. After a particular region is selected, the transparency of the original virtual LE image (i.e., the aggregate stack of frames) is increased, and the virtual LE image is arranged to overlay a single frame to reveal the corresponding portion of the single frame in the selected region. Through this process, the single frame and the virtual LE image are blended together to create the selective virtual LE image. A user may choose the particular frame to use in the selected region out of the stack of frames. Additional regions of pixels may be selected, and the same frame or a different frame may be used in those regions. Through this process, the user is able to control application of the long-exposure effect by removing the effect from regions in which the appearance of movement was incidental or is not desired.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIGS. 3A and 3B illustrate example frames aggregated to form a virtual LE image that may be provided in accordance with embodiments of the present disclosure;

FIGS. 5 and 6 illustrate example selective virtual LE images with different frames for the selected region in accordance with embodiments of the present disclosure;

DETAILED DESCRIPTION

Figure 1:
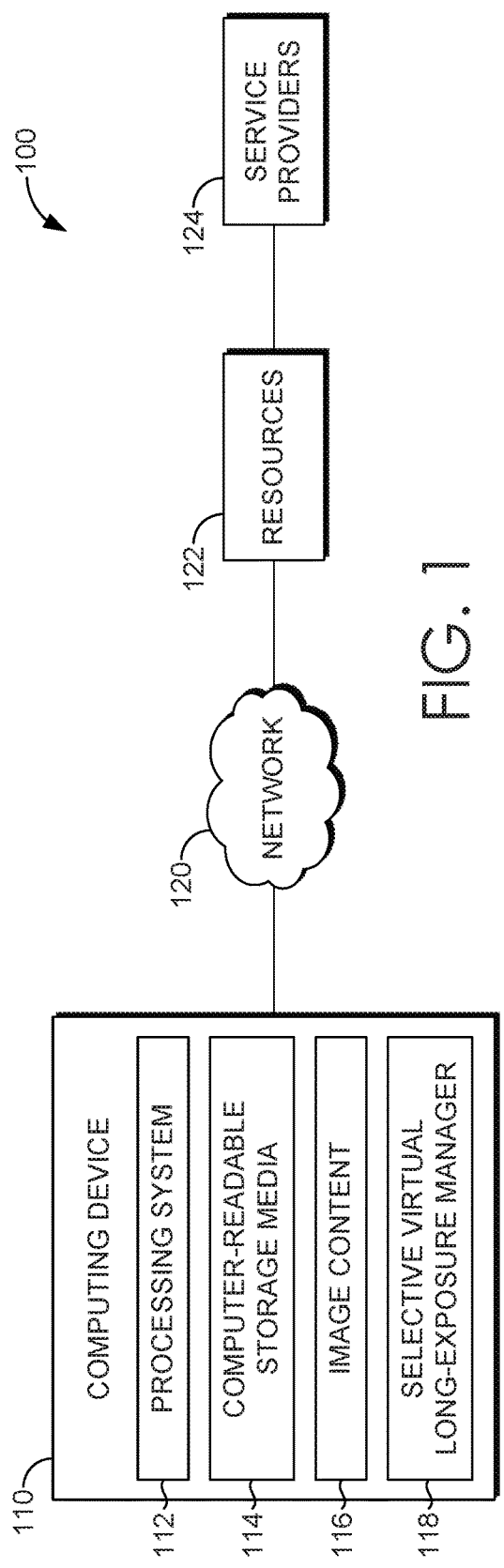
FIG. 1 is a block diagram showing an example of an operating environment, in accordance with embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Overview

Long-exposure photography is a technique using a long-duration shutter speed to sharply capture stationary elements while blurring moving elements, creating appearance of a trail of movement. To achieve this long-exposure visual effect, the camera should remain stationary during the duration of the image capturing and, as such, is commonly used with a tripod. However, transporting and setting up a tripod can be cumbersome, while many people today prefer portable photography options, including using cameras provided on smartphone devices. As such, virtual long-exposure techniques have developed to create a long-exposure image without the need for a tripod. Rather than using a single image taken with a long-duration shutter speed, virtual long-exposure techniques utilize several short-exposure images, also referred to herein as short-exposure frames, that are taken in quick succession. Through alignment techniques and image aggregation, the stack of short-exposure (SE) frames form a virtual LE image with stationary elements being sharply represented and moving elements having a blurred appearance.

However, with these techniques, the long-exposure effect is applied indiscriminately such that every moving element from the captured scene results in a blurry representation in the resultant image. In this way, the photographer lacks control over which moving objects should leave a trail or appear blurry. For example, waterfalls are common subjects for a long-exposure photography with the desired result being the moving water appearing as a blurry trail. But it is not uncommon that a scene with a waterfall will also include moving tree leaves or people, which will also appear blurry even if that is not the desired result. The photographer is, therefore, restricted to either not including moving background elements or having a less aesthetically appealing image.

Accordingly, embodiments of the present invention are directed to improving over these conventional techniques by facilitating selective use of the long-exposure effect. In this way, a resultant image can include the long-exposure effect (i.e., blurred or trailing appearance) for some moving elements while other elements that were moving during image capturing are presented as a still element. Generally, a virtual LE image is provided. As used herein, a virtual LE image is a digital image created from a stack, which refers to a plurality of aggregated and aligned frames. As used herein, the frames may comprise a plurality of photographs taken in succession or may be still frames of a video sequence. The frames are also referred to herein as SE frames to indicate that these frames are taken with a shorter duration shutter speed than traditional long-exposure images and, thus, as used herein, SE frames may include images with either a normal or short duration shutter speed.

In this virtual LE image, the long-exposure effect is applied to every moving element. To remove the long-exposure effect in areas in which such effect is not desired, a user selects the region of pixels on the virtual LE image, and the transparency of the pixels within the selected region on the virtual LE image is automatically increased. The virtual LE image is arranged over an individual frame from the stack of frames so that a portion of the individual frame is visible in place of the blurred element in the selected region of the virtual LE image. The resultant image, referred to herein as the selective virtual LE image, may comprises at least a first region depicting the aggregation of frames, which may include the long-exposure effect to depict a moving element, and a second region depicting a stationary element from the individual frame. Through this process, the user is able to advantageously control application of the long-exposure effect by removing the effect from regions in which the appearance of movement was incidental or is not desired.

A user can choose the individual frame out of the stack forming the virtual LE image for use in the selected region. Accordingly, the user may have multiple options for the resultant selective virtual LE image depending on the individual frame used. In some embodiments, a user interface with a slider object is presented such that a user can view different frames for use with the virtual LE image by adjusting the position of the slider. Each frame may be blended with the virtual LE image so that a user can see the different options for the selective virtual LE image with that particular frame.

There may be multiple regions with moving elements for which a user wants to remove the long-exposure effect. Accordingly, multiple regions of pixels on the original virtual LE image may be selected by a user and made transparent for making visible an individual frame. In some embodiments, a user is able to select different individual frames for the different regions, thereby increasing the amount of control and flexibility a user has in creating the final selective virtual LE image. As each selected region is replaced by a single frame, the selective virtual LE images may comprise the original virtual LE image overlaying multiple frames. As such, in addition to increasing transparency of a second selected region in the virtual LE image, any individual frame overlaying another individual frame will have increased transparency in that second selected region.

Example Operating Environment

Turning now to FIG. 1, a block diagram is provided showing an example of an operating environment in which some implementations of the present disclosure may be employed. It should be understood that this environment and other arrangements described herein are set forth only as examples. Other arrangements and elements (e.g., machines, interfaces, functions, orders, and groupings of functions, etc.) can be used in addition to or instead of the specific arrangement and elements shown, and some elements may be omitted altogether for the sake of clarity. Further, many of the elements described herein are functional entities that may be implemented as discrete or distributed components or in conjunction with other components and in any suitable combination and location. Various functions described herein as being performed by one or more entities may be carried out by hardware, firmware, and/or software. For instance, some functions may be carried out by a processor executing instructions stored in memory.

Among other components not shown, operating environment 100 illustrates an example implementation that is operable to employ techniques described herein. The illustrated environment 100 includes a computing device 110 having a processing system 112 that may include one or more processing devices (e.g., processors) and one or more computer-readable storage media 114. The illustrated environment 100 also includes image content 116 and a selective virtual long-exposure manager 118 embodied on the computer-readable storage media 114 and operable via the processing system 112 to implement corresponding functionality described herein. In at least some implementations, the computing device 110 may include functionality to access various kinds of web-based resources (content and services), interact with online providers, and so forth as described in further detail below.

The computing device 110 may be configured as any suitable type of computing device. For example, the computing device 110 may be configured as a server, a desktop computer, a laptop computer, a mobile device (e.g., a handheld configuration), a tablet, a camera (point-and-shoot, single lens reflex (SLR), a video recorder, etc.), a device configured to receive speech input, a device configured to receive stylus-based input, a device configured to receive a combination of those inputs, and so forth. Thus, the computing device 110 may range from full resource devices with substantial memory and processor resources (e.g., servers, personal computers, game consoles) to a low-resource device with limited memory and/or processing resources (e.g., mobile devices). Additionally, although a single computing device 110 is shown, the computing device 110 may be representative of a plurality of different devices to perform operations "over the cloud."

The environment 100 further depicts one or more service providers 124, configured to communicate with computing device 110 over a network 120, such as the Internet, to provide a "cloud-based" computing environment. Generally, service providers 124 are configured to make various resources 122 available over the network 120 to clients. In some scenarios, users may sign up for accounts that are employed to access corresponding resources from a provider. The provider may authenticate credentials of a user (e.g., username and password) before granting access to an account and corresponding resources 122. Other resources 122 may be made freely available (e.g., without authentication or account-based accessed). The resources 122 can include any suitable combination of services and/or content typically made available over a network by one or more providers. Some examples of services include, but are not limited to, photo printing services (e.g., Snapfish®, Shutterfly®, and the like), photo storage and/or sharing services (e.g., Flickr®), social network services (e.g., Facebook®, Twitter®, Instagram®, and the like), etc.

These sources may serve as significant amounts of image content. Such image content may be formatted in any of a variety of image formats, including but not limited to JPEG, TIFF, RAW, GIF, BMP, PNG, etc. The image content made available through the services may be posted by users that have accounts with those services. For example, a user having an account with a photo storage and/or sharing service may upload images, such as those taken with a digital camera of the user, or those sent to the user via electronic means. A user of the photo storage and/or sharing service may then share their uploaded images with others, such as by providing a link to photo albums or to a profile of the user.

The selective virtual long-exposure manager 118 is generally configured to represent functionality to implement selective application of the long-exposure effect in virtual LE images, which may be part of or created from image content 116. In particular, the selective virtual long-exposure manager 118 can facilitate integration of a single frame in a portion of a virtual LE image to remove any undesirable blurring resulting from the aggregation of frames in creating the virtual LE image.

When frames are aggregated to form a virtual LE image, the frames may be aligned based on similarly of background pixels at each pixel location. Using this alignment, pixels within the individual frames correspond to pixels in the aggregated virtual LE image. To create a selective virtual LE image, a user's selection of a region of pixels on the virtual LE image is received, and the corresponding pixels from one of the individual frames used to create the virtual LE image visually replace the selected pixels on the aggregated image, which will remove the blurred appearance in that region. This replacement may be accomplished by, for example, increasing the transparency of the pixels selected from the virtual LE image and layering the aggregated virtual LE image on top of an individual frame so that the corresponding pixels of the individual frame are visible through the transparent region of the virtual LE image.

The resulting selective virtual LE image may be presented to a user through a user interface. In a photo-editing application, for instance, the image content 116 (e.g., digital images) may be accessed from storage, and, upon selection of the region by the user, multiple selective virtual LE images using different individual frames may be suggested through the user interface. In exemplary embodiments, the original virtual LE image is maintained on the user interface while different individual frames are presented and blended with the original virtual LE image based on user interaction with the interface. For example, a user may engage with a slider object on the user interface to scroll through different individual frames for use within the selected region of the virtual LE image. The user may select a particular selective virtual LE image presented on the interface, and the selected selective virtual LE image may be saved or left on the interface for further use within the photo-editing application.

The selective virtual long-exposure manager 118, or aspects or components associated therewith, may be implemented as software modules, hardware devices, or using a combination of software, hardware, firmware, fixed logic circuitry, etc. Further, the selective virtual long-exposure manager 118, or components associated therewith, may be implemented as a standalone component of the computing device 110 as illustrated. Additionally or alternatively, the selective virtual long-exposure manager 118 may be configured as components of web services, applications, an operating system of the computing device 110, plug-in modules, or other device applications.

Figure 2:
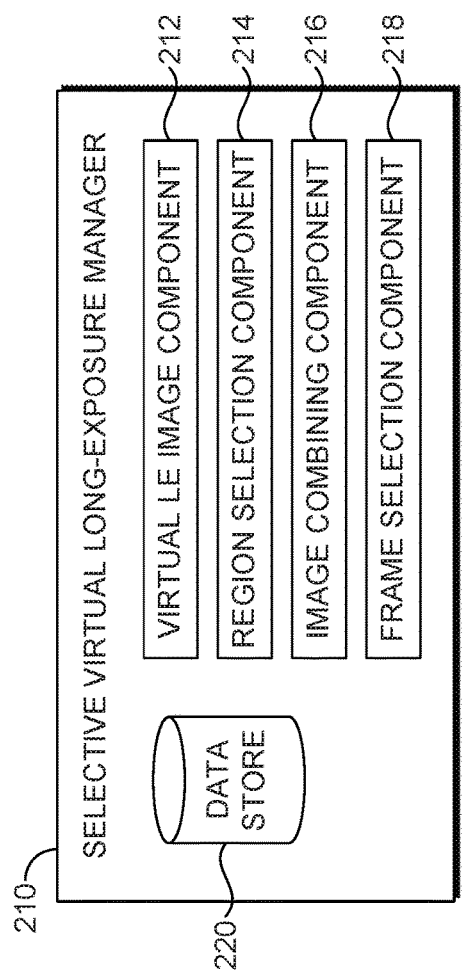
FIG. 2 provides an exemplary selective virtual long-exposure manager in accordance with embodiments of the present invention.

Turning now to FIG. 2, an exemplary selective virtual long-exposure manager 210 (which may represent manager 118 of FIG. 1) is provided in accordance with embodiments of the present invention. The selective virtual long-exposure manager 210 is illustrated with a virtual LE image component 212, a region selection component 214, an image combining component 216, a frame selection component 218, and a data store 220. These components represent functionality of the selective virtual long-exposure manager 210, and it should be appreciated that such functionality may be implemented using more or fewer components than those illustrated.

The selective virtual long-exposure manager 210, and/or components associated therewith, can access data store 220. Data store 220 can store any type of data used in association with creation of selective virtual LE images. By way of example only, data store 220 may include SE frames, virtual LE images, selections of regions for removal of the long-exposure effect, selective virtual LE image options, saved selective virtual LE images, image sizes, image dimensions, image alignment information, and/or the like. Such data may be provided to or referenced by the selective virtual long-exposure manager 210, or components thereof. Further, the selective virtual long-exposure manager 210, or components thereof, may provide such data to the data store 220 for subsequent use.

At a high level, the selective virtual long-exposure manager 210 is configured to facilitate creating selective virtual LE images in which a long-exposure effect created by aggregating frames is replaced with an individual frame. Generally, the virtual LE image component 212 is configured to provide a previously created virtual LE image or to create a virtual LE image through aggregation and alignment of a plurality of frames. The region selection component 214 is configured to receive a user's selection of a region of pixels on the virtual LE image, which may include undesirable blurred appearance caused by moving elements. The image combining component 216 is configured to automatically combine the virtual LE image with a frame such that a portion of the individual frames visibly replaces the selected region of the virtual LE image. The image combining component 216 may combine the virtual LE image with multiple individual frames to create different selective virtual LE image options, and the frame selection component 218 is configured to receive a selection of a particular frame for the selective virtual LE image, as described in more detail below.

As mentioned, the virtual LE image providing component 212 is configured to provide a virtual LE image. The virtual LE image is an aggregated stack of successive frames that are aligned based on similarity of pixels. Through the alignment and aggregation, movement of elements captured through the successive frames are depicted in the aggregated form (i.e., the virtual LE image) as having a blurred effect. Turning to FIG. 3A, frames 302, 304, and 306 are example SE frames taken in succession that capture a person waving his arms. These frames may have been taken individually by a user or as successive frames through an automated camera function, such as a photograph burst mode, or may be still frames extracted from a video file. FIG. 3B illustrates frames 302, 304, and 306 aligned and aggregated to create a stack 310. In exemplary aspects, the alignment of frames is based on similarity of background pixels at each pixel location over the aligned stack. The stack 310 includes blurred portions 312 and 314 resulting from the change in position of the person's arms between frames 302, 304, and 306.

Returning to FIG. 2, the virtual LE image component 212 may provide the virtual LE image by creating the virtual LE image through aggregation and alignment techniques. Alternatively, the virtual LE image may be provided through receipt of virtual LE image generated by a separate component. In some instances, the virtual LE image is provided as a layered image, with each layer being an individual frame, while in other embodiments, the virtual LE image is flattened such that the individual frames are merged into a single layer. In embodiments in which the virtual LE image is received as a single layer from a separate component, at least some of the individual frames forming the virtual LE image are also provided.

Figure 4A:
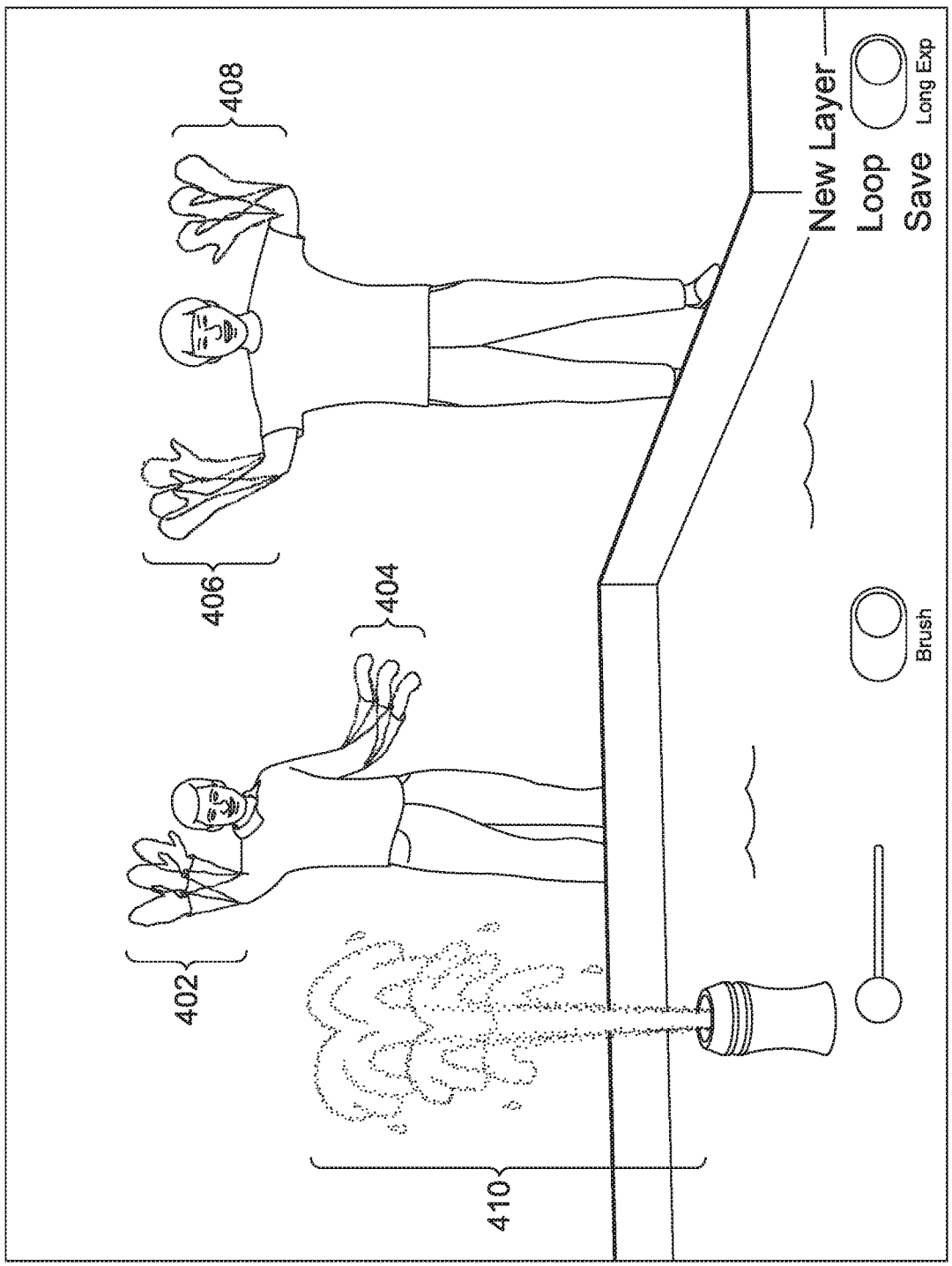
FIG. 4A illustrates an example virtual LE image provided on a user interface in accordance with embodiments of the present disclosure.

The region selection component 214 is configured to receive a user's selection of a region of pixels within the virtual LE image, which may include an undesirable blurred appearance caused by moving elements. As previously explained, a virtual LE image may have the blurred appearance for all the moving elements when the user may not have wanted to capture all of the motion. FIG. 4A, for example, depicts an example virtual LE image 400 as displayed on a user interface, and the virtual LE image 400 has five regions of motion: regions 402 and 404 representing a first person's moving arms, regions 406 and 408 representing a second person's moving arms, and region 410 representing moving water in a water fountain. Each of regions 402, 404, 406, 408, and 410 have a blurred appearance.

Figure 4B:
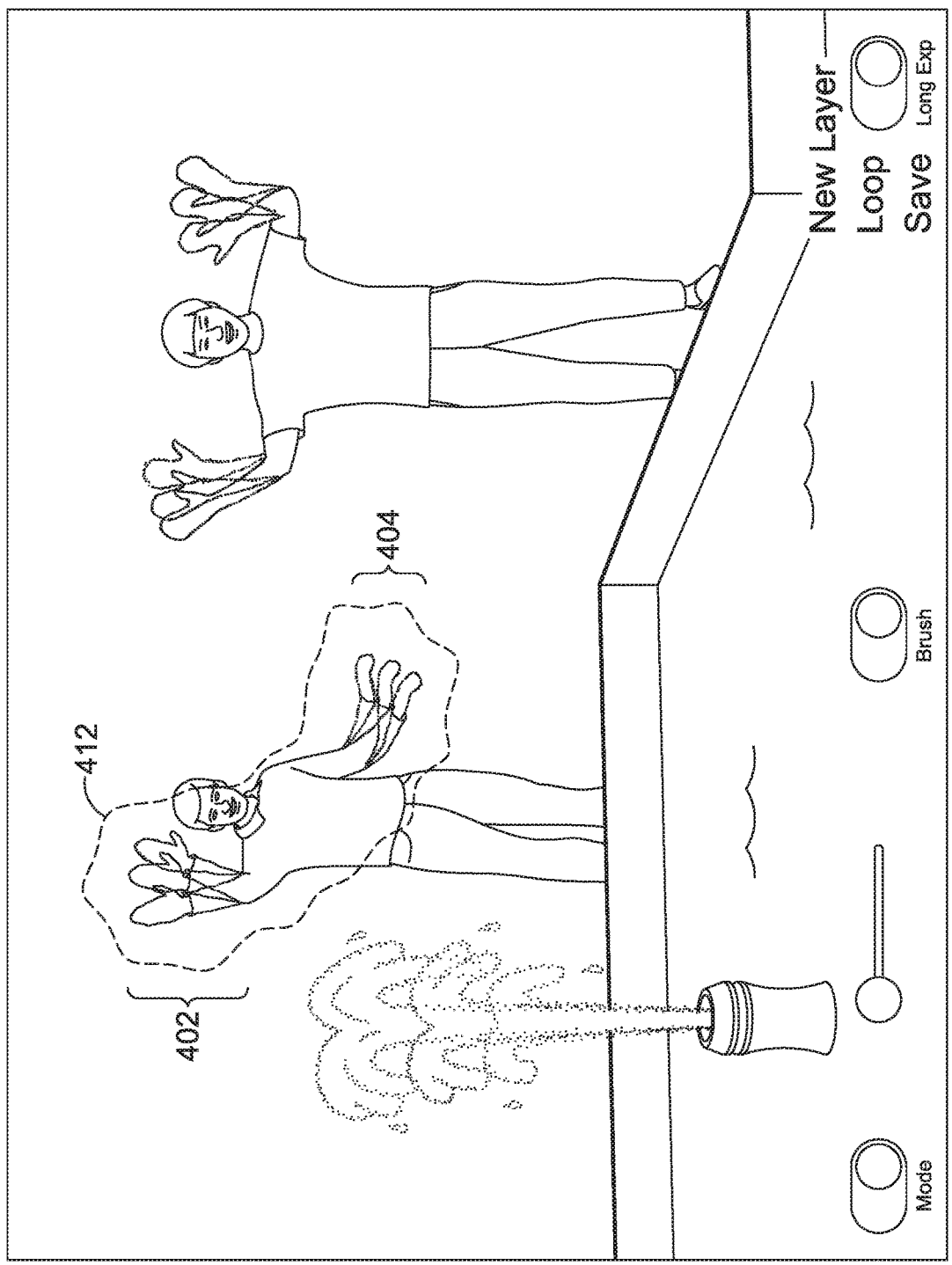
FIG. 4B illustrates a region of the example virtual LE image of FIG. 4A selected for removal of the long-exposure effect in accordance with embodiments of the present disclosure.

A user may desire for one or more of the blurred regions to have a sharper appearance. Accordingly, a user may select a region of pixels for removal of the long-exposure effect. The selection may be received through one or more input devices, such as a cursor control device, including a mouse, a touch pad, a button, a stylus on a tablet, a track ball, or another suitable input device or may be received through touch input received from a touchscreen of a user device through a stylus, finger, or other instrument. In some embodiments, the size and shape of the region selected is determined by the user, providing increased control and flexibility to the user. For example, the user may use a mouse to outline a region for selection or brush the user's finger over a region on a touchscreen. FIG. 4B depicts the virtual LE image 400 with a user selected region 412 over a portion of the image 400. The user-selected region 412 encompasses blurred regions 402 and 404. The user-selected region may be marked with a visual indicator. For instance, in FIG. 4B, region 412 is outlined with a dashed line, but it is contemplated that other visual indicators may be used. In exemplary embodiments, for example, the user-selected region 412 is presented as a different color than the rest of the virtual LE image 400. In addition to or alternatively, the user-selected region 412 may be presented as having a different opacity or brightness. As depicted in FIG. 4B, the region 412 selected by the user may comprise a single, continuous grouping of pixels. In some embodiments, a user can select multiple distinct groupings of pixels separated from each other by non-blurred regions. For example, the selected region 412 in FIG. 4B could encompass blurred regions 402 and 404 but not include the non-blurred region of pixels depicting the person's head and torso.

Returning to FIG. 2, once a selection of a region of pixels is received, the image combining component 216 is configured to automatically combine the virtual LE image with an individual frame such that a portion of the individual frame visibly replaces the selected region of the virtual LE image. In exemplary embodiments, this process is performed by increasing the transparency of the virtual LE image in the selected region and overlaying the virtual LE image on an individual frame such that pixels from the individual frame corresponding to the selected region are visible with the unselected portion of the virtual LE image. The virtual LE image may have a number of color channels and an alpha channel controlling the transparency level. As such, increasing the transparency level may be done by adjusting the alpha channel. Overlaying the virtual LE image on the individual frame may comprise rendering the individual frame and rendering the virtual LE image with the translucent region on top of the individual frame. Overlaying the virtual LE image and the individual frame and adjusting the transparency is also referred to herein as alpha blending.

Additionally, in some aspects, a smoothing process is automatically performed over the selected region of the virtual LE image after the region selection is received. Specifically, a Gaussian smoothing may be performed for the selected region with a kernel size d specifying size of a brush and sigma a specifying a hardness of the brush, but it is contemplated that alternative smoothing techniques may be applied to remove noise.

Figure 7A:
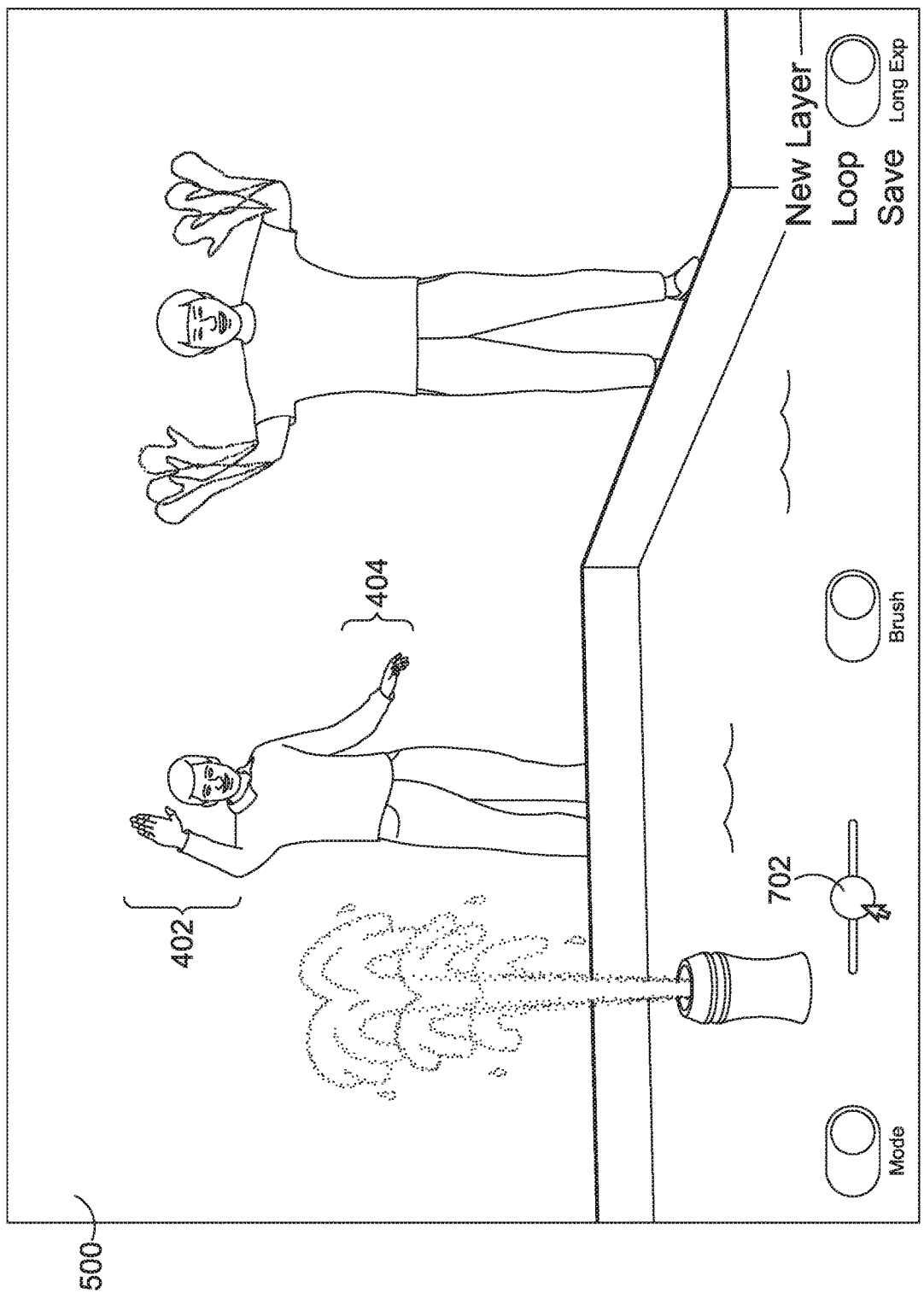
FIGS. 7A and 7B illustrate the example selective virtual LE images from FIGS. 5-6, respectively, as presented on a user interface in accordance with embodiments of the present disclosure.

FIG. 5 depicts a selective virtual LE image 500 comprising the virtual LE image 400 overlaying a first individual frame 420. The first individual frame 420 shows the first person's arms in the selected region 412 (which includes blurred regions 402 and 404) in a first position. Because the pixels visible in selected region 412 is from individual frame 420 rather than the virtual LE image 400, the first person's arms have a sharper representation to appear stationary. But other areas of the selective virtual LE image 500, including the second person's arms in regions 406 and 408 and the water fountain in region 410, still have a blurred appearance due to the aggregation of multiple frames in the original virtual LE image 400 forming those regions. In FIG. 5, the selected region 412 is indicated with the dashed outline; however, it is contemplated that, in some embodiments, when the combined images are presented to the user, there may not be a visual indicator of the selected region 412 such that there appears to be a seamless transition between the individual frame 420 and the virtual LE image 400 as shown in FIG. 7A.

The image combining component 216 may combine the virtual LE image with multiple individual frames to create different selective virtual long-exposure options. For instance, if virtual LE image 400 comprises a stack of three frames, the virtual LE image 400 may be combined with any individual frame out of those three frames. As mentioned, FIG. 5 shows the virtual LE image 400 overlaying a first frame 420, which includes the first person's arms in the selected region 412 in a first position. Turing to FIG. 6, a different selective virtual LE image 600 is provided with the virtual LE image 400 overlaying a second frame 430 depicting the first person's arms in a second position. The virtual LE image 400 may be similarly combined with the third individual frame. Each combination may be provided to the user as an optional selective virtual LE image, and the user may select the final selective virtual LE image based on the desired position of the moving element (the first person's arms) in the individual frame.

Accordingly, in an embodiment of the disclosure reduced to practice, an aligned stack of images, denoted as $A=\{I_i^{(a)}; i \in \{1, \ldots, N\}\}$, is obtained from a plurality of frames $\{I_i; i \in \{1, \ldots, N\}\}$. The resultant photo L is displayed to the user and has the long-exposure effect in one or more regions. Using the original virtual LE image L, a selective virtual LE image S may be created with a portion of the virtual LE image L being visibly replaced with one of the frames $\{I_i; i \in \{1, \ldots, N\}\}$. To this end, one or more regions $R_j$ of the virtual LE image L is selected by the user. For each selected region $R_j$; $j \in \{1, \ldots, K\}$, where K is the number of selected regions, the following processes are performed:

Gaussian smoothing with kernel size d and sigma σ is applied on $R_j$ to obtain $R_j^{(s)}$.

Alpha channel of S is set to $R_j^{(s)}$ to get $S_j$.

An individual aligned frame $I_{s(j)}^{(a)}$ is rendered with $S_j$ (which has one or more transparent regions) being rendered over $I_{s(j)}^{(a)}$, which effectively results in alpha blending of $I_{s(j)}^{(a)}$ and $S_j$.

Figure 7B:
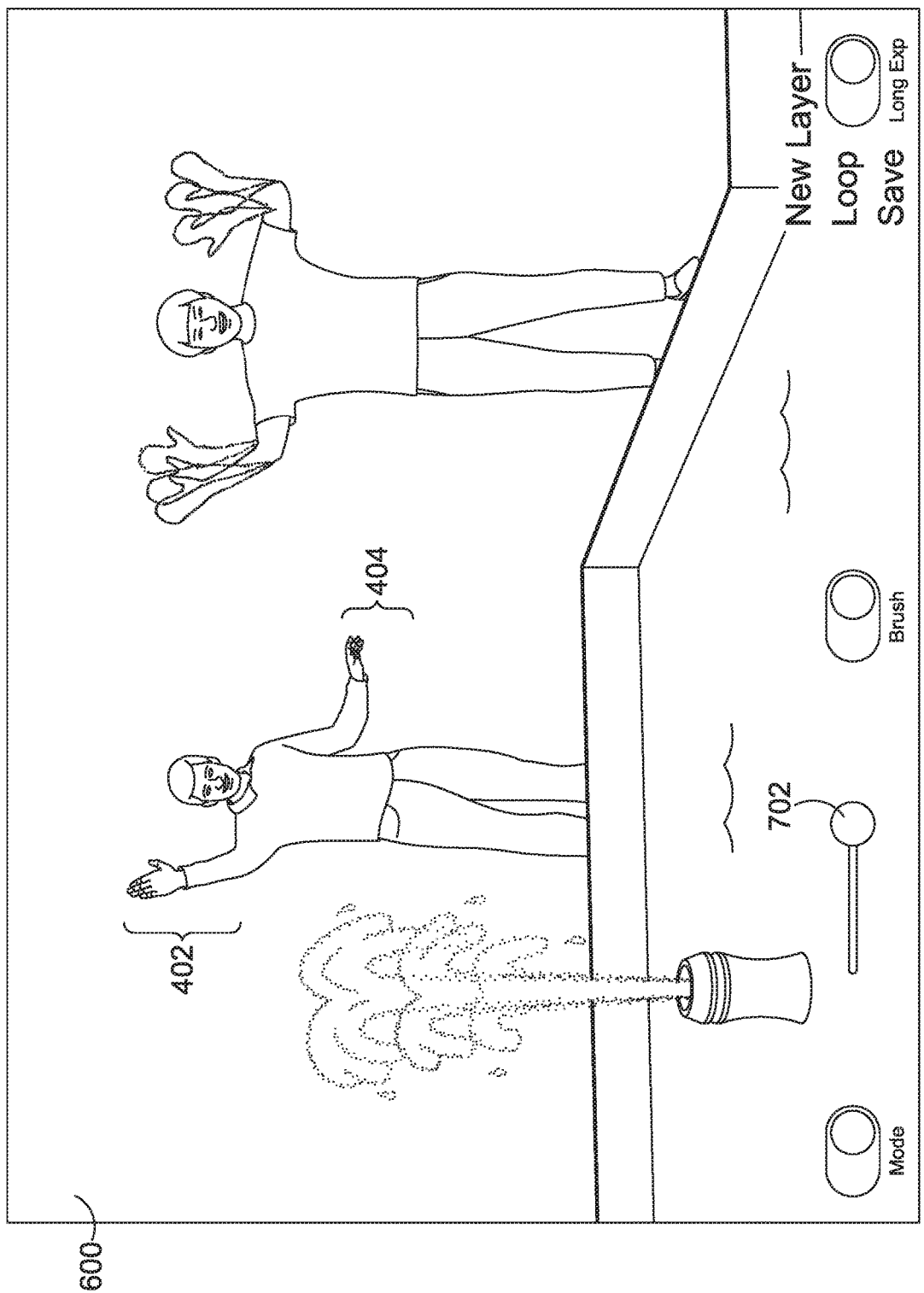

Returning to FIG. 2, the frame selection component 218 is configured to receive a selection of a particular frame for the selective virtual LE image. Accordingly, the user may be presented with different frames for use with the virtual LE image. In exemplary aspects, the individual frames are presented with the virtual LE image such that the user can see the resultant selective virtual LE image. In some aspects, the different options for the selective virtual LE image based on the different frames may be presented individually on the graphic user interface, and the user can scroll through the different options using a slider. FIGS. 7A and 7B illustrate the selective virtual LE image options 500 and 600 created using frames 420 and 430, respectively, on an example graphic user interface in accordance with embodiments of the disclosure. Both selective virtual LE images 500 and 600 are presented with a slider object 702 on the user interface. The position of the slider object 702 corresponds to a particular frame, and, as such, movement of the slider object 702 changes the particular frame being combined with the virtual LE image 400 and presented for display. As illustrated through FIGS. 7A and 7B, a user may move the slider object 702 to view the different options for the selective virtual LE image, such as selective virtual LE images 500 and 600. In some embodiments, adjustment of the slider object 702 changes the particular frame while the virtual LE image 400 overlaying the frame stays. Accordingly, the virtual LE image 400 and the individual frame, such as frame 420 or frame 430, are blended together each time an option is displayed. It is also contemplated that the options for the selective virtual LE image are presented in other manners, such as displaying a plurality of selective virtual-long exposure images with the different individual frames all together. Additionally, the individual frames may be presented without the overlaying virtual LE image, and a particular frame is combined with the virtual LE image after the user selects the frame.

Figure 8A:
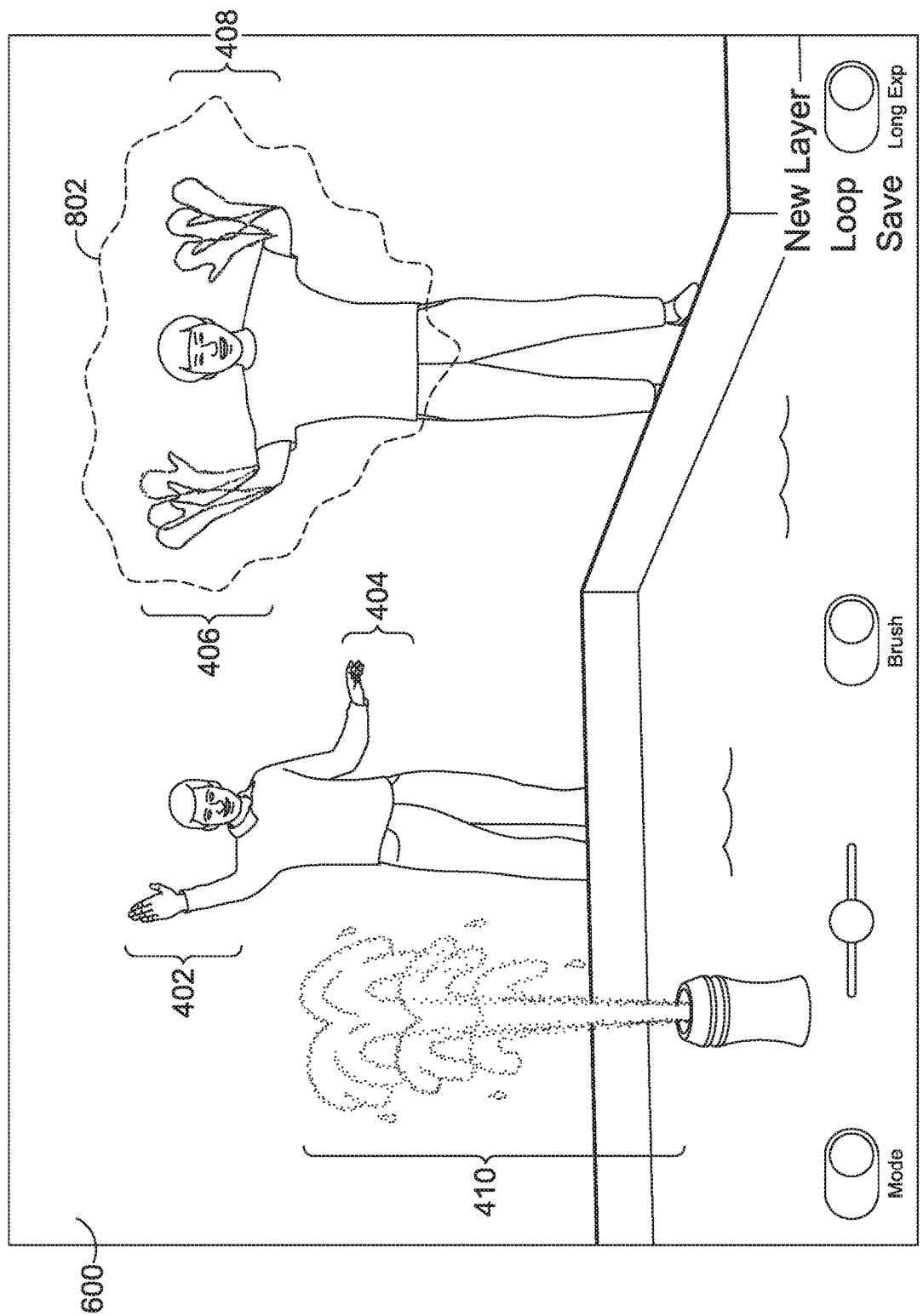
FIGS. 8A-8C illustrate a second region of the example virtual LE image of FIG. 4A being selected for removal of the long-exposure effect in accordance with embodiments of the present disclosure.

Multiple blurred regions within the virtual LE image may be replaced in this manner. Accordingly, after a user has selected the individual frame for use within a first selected region, a user may select a second region for removal of the long-exposure effect. FIG. 8A, for instance, depicts the selective virtual LE image 600 from FIG. 7B created with frame 430 for the selected region 412. A selection of a second region of pixels 802 is then received similar to the selection of the first region 412. The second region 802 encompasses the blurred regions 406 and 408 of the second person's moving arms.

This second selected region 802 may be visually replaced with corresponding pixels from an individual frame in a similar manner as described for the first selected region 412. Specifically, an individual frame is combined with the selective virtual LE image 600, and the transparency of any overlays is increased at the second region 802. In exemplary aspects, the selective virtual LE image 600 is a layered image comprising the original virtual LE image 400 overlaying the individual frame 430. As such, both the virtual LE image 400 and the individual frame 430 may be combined with a second individual frame, and the transparency levels of both the virtual LE image 400 and the individual frame 430 may be increased so that the second individual frame is visible through both overlaying layers. By keeping the layers separate, a user can later change the selected frame for use with the first selected region 412. It is also contemplated, however, that after selection of frame 430 for the first selected region 412, frame 430 and the virtual LE image 400 are merged to create one layer. In this case, only a single layer (i.e., the merged selective virtual LE image 600) overlays the new individual frame.

Figure 8B:
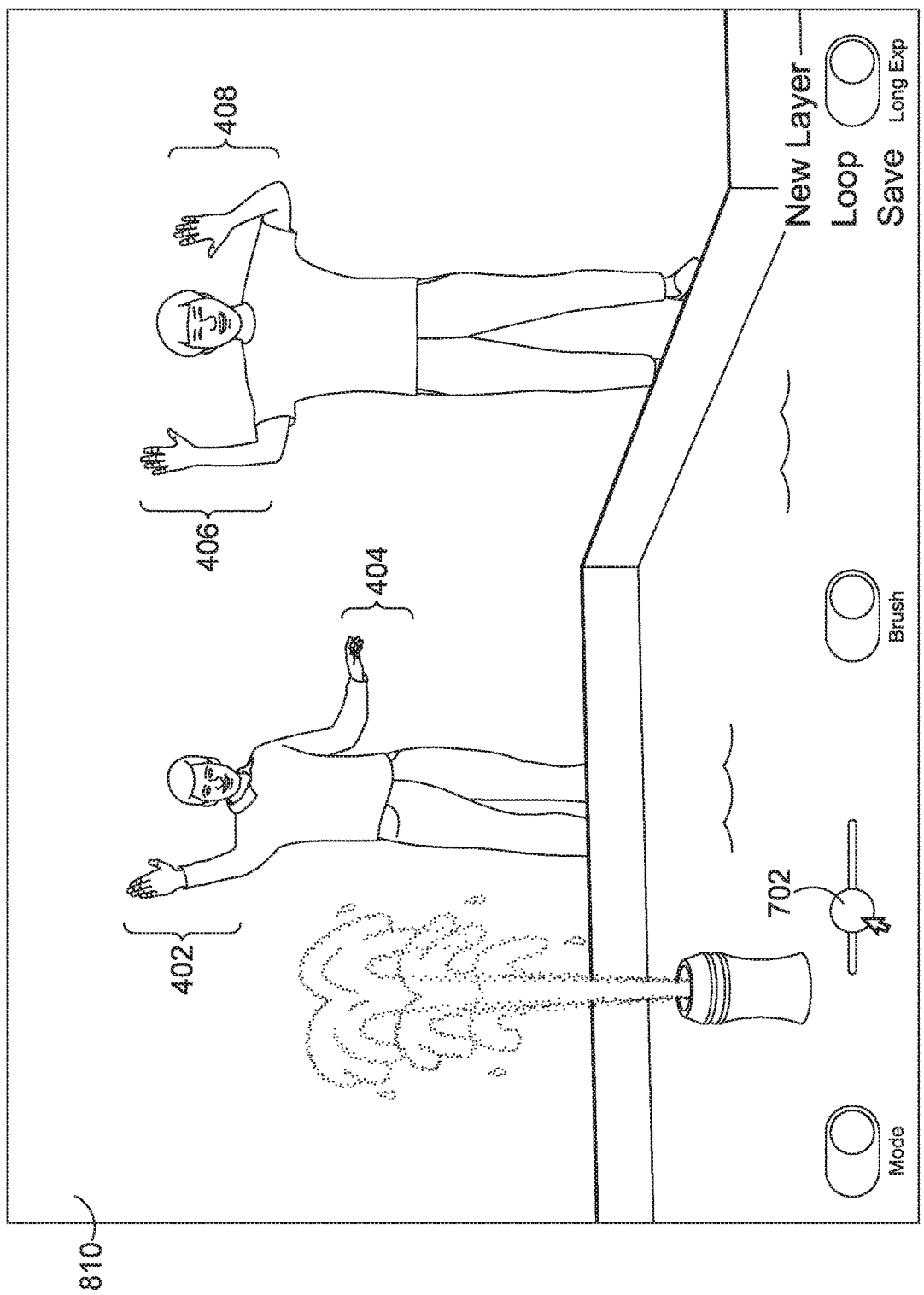

Through this process, an updated selective virtual LE image is created based on the selective virtual LE image 600 and an individual frame, which may be any of the frames used to create the original virtual LE image 400. For instance, the second individual frame for replacing the second region 802 may be the same frame or different frame as the one replacing the first region 412. FIG. 8B presents an option for the updated selective virtual LE image 810 using a second frame. In the updated selective virtual LE image 810, the second person's arms in regions 406 and 408 are depicted through an individual frame and, therefore, are illustrated as stationary elements while the water fountain in region 410, being depicted from the aggregate frames of the virtual LE image 400, is blurred.

Figure 8C:
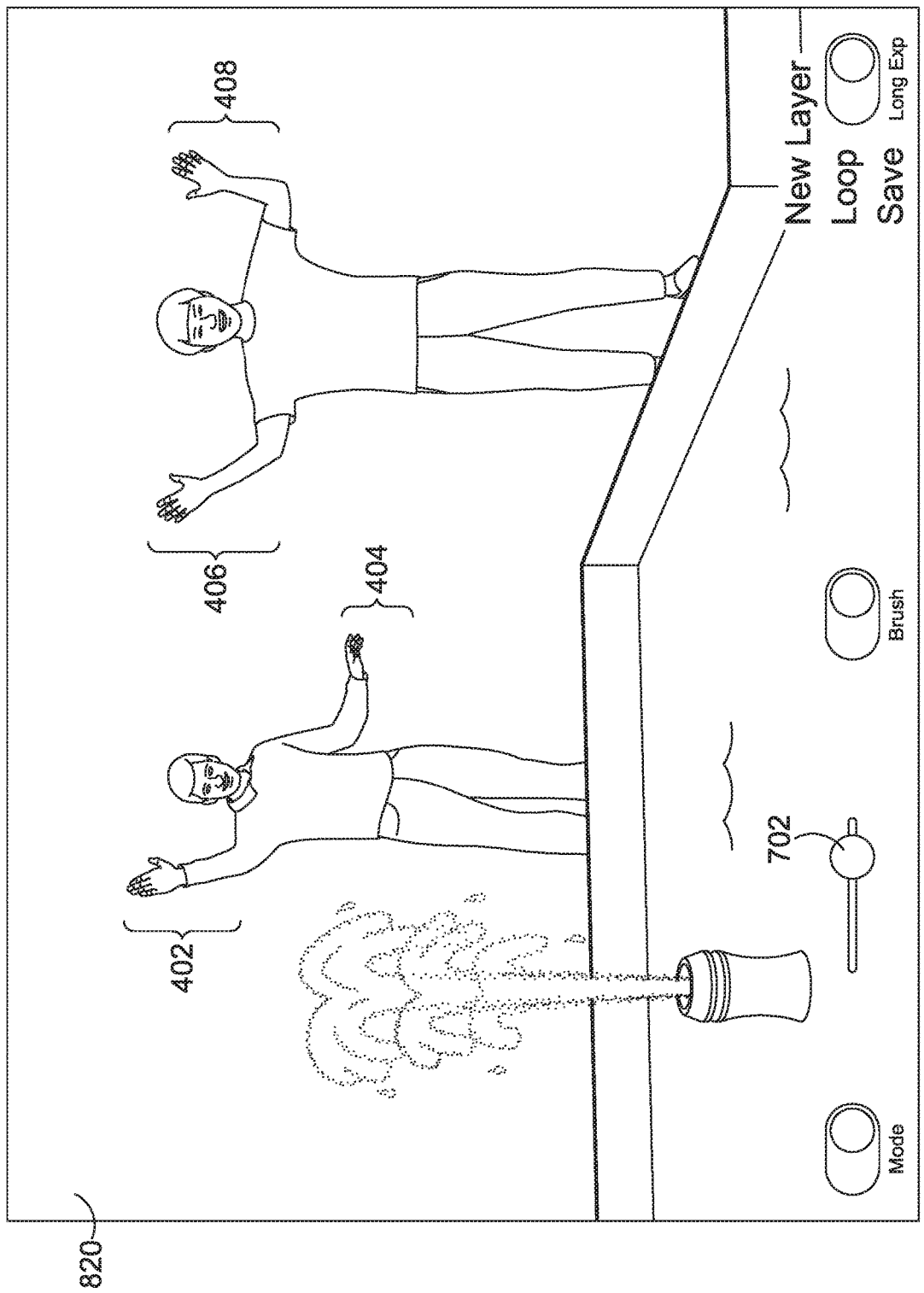

Similar to the first selected region 412, multiple options for the updated selective virtual LE image may be presented to the user based on different frames via the slider object 702, as illustrated in FIGS. 8B and 8C. FIGS. 8B and 8C provide updated selective virtual LE images 810 and 820, respectively, based on different frames for the second selected region 802 (encompassing regions 406 and 408). As such, a user can select which frame to use based on the desired position of the second person's arms in selected region 802 in a similar manner discussed with respect to selected region 412.

Exemplary Implementations of Selective Virtual LE Image Generation

Figure 9:
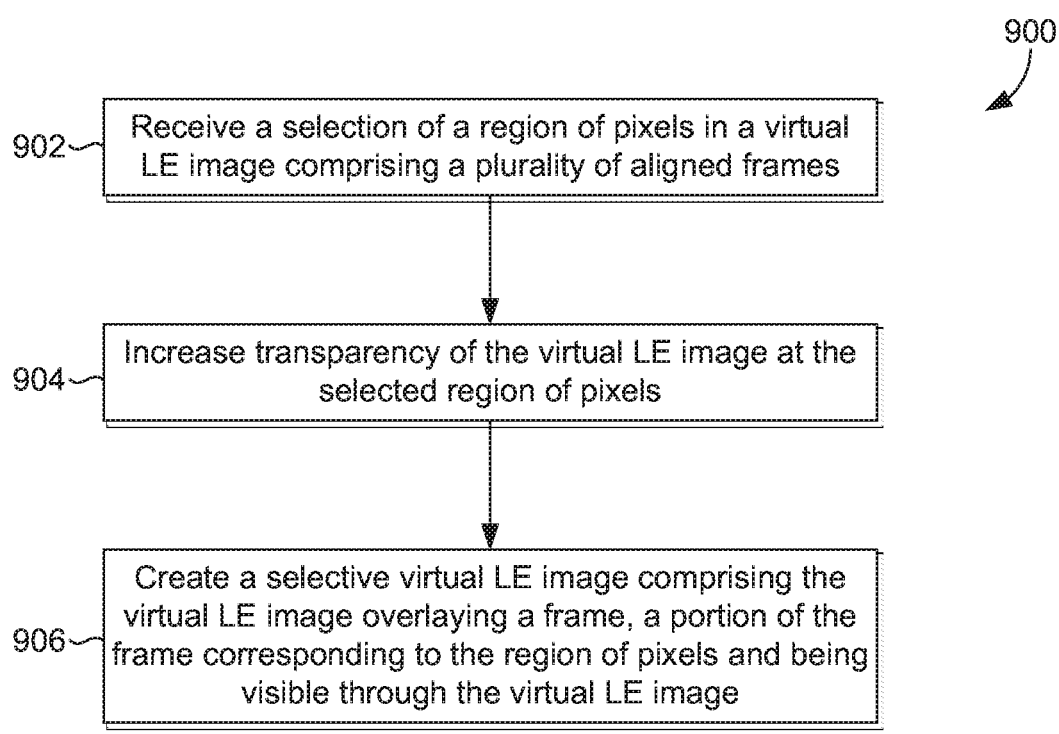
FIGS. 9 and 10 are flow diagrams showing methods of creating selective virtual LE images in accordance with embodiments of the present disclosure.

Referring now to FIG. 9, a flow diagram is provided showing an embodiment of a method 900 for generating selective virtual LE images. Each block of method 900 and other methods described herein, including method 1000 of FIG. 10, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. The blocks of the method may be performed in whole or in part by the selective virtual long-exposure manager 210 of FIG. 2.

Initially, at block 902, a selection of a region of pixels in a virtual LE image is received. The virtual LE image comprises a plurality of aligned frames, such as SE frames. The region of pixels may be selected by user input via a mouse, touch display, and the like. At block 904, the transparency of the virtual LE image at the selected region of pixels is increased. The transparency may be increased by adjusting the alpha channel of the virtual LE image. At block 906, a selective virtual LE image is created based on the selected region of pixels. The selective virtual LE image is created by overlaying the virtual LE image over one of the frames that makes up the virtual LE image. In some embodiments, a smoothing process, such as Gaussian smoothing, automatically occurs at the selected region of pixels in the virtual LE image. The selective virtual LE image is rendered for presentation on a user interface. The selective virtual LE image is presented as a visible portion of the long-exposure image and a visible portion of the frame that is aligned with the selected region of pixels.

In exemplary aspects, a user may view multiple selective virtual LE images using different frames to correspond to the region of pixels selected within the virtual LE image. For example, a second selective virtual LE image may be created by combining a second frame with the virtual LE image, while a third selective virtual LE image may be created by combining a third frame with the virtual LE image. In some aspects, the different selective virtual LE images are presented individually on a graphic user interface, and a user can scroll through the different selective virtual LE images using, for example, a slider object on the graphic user interface.

Figure 10:
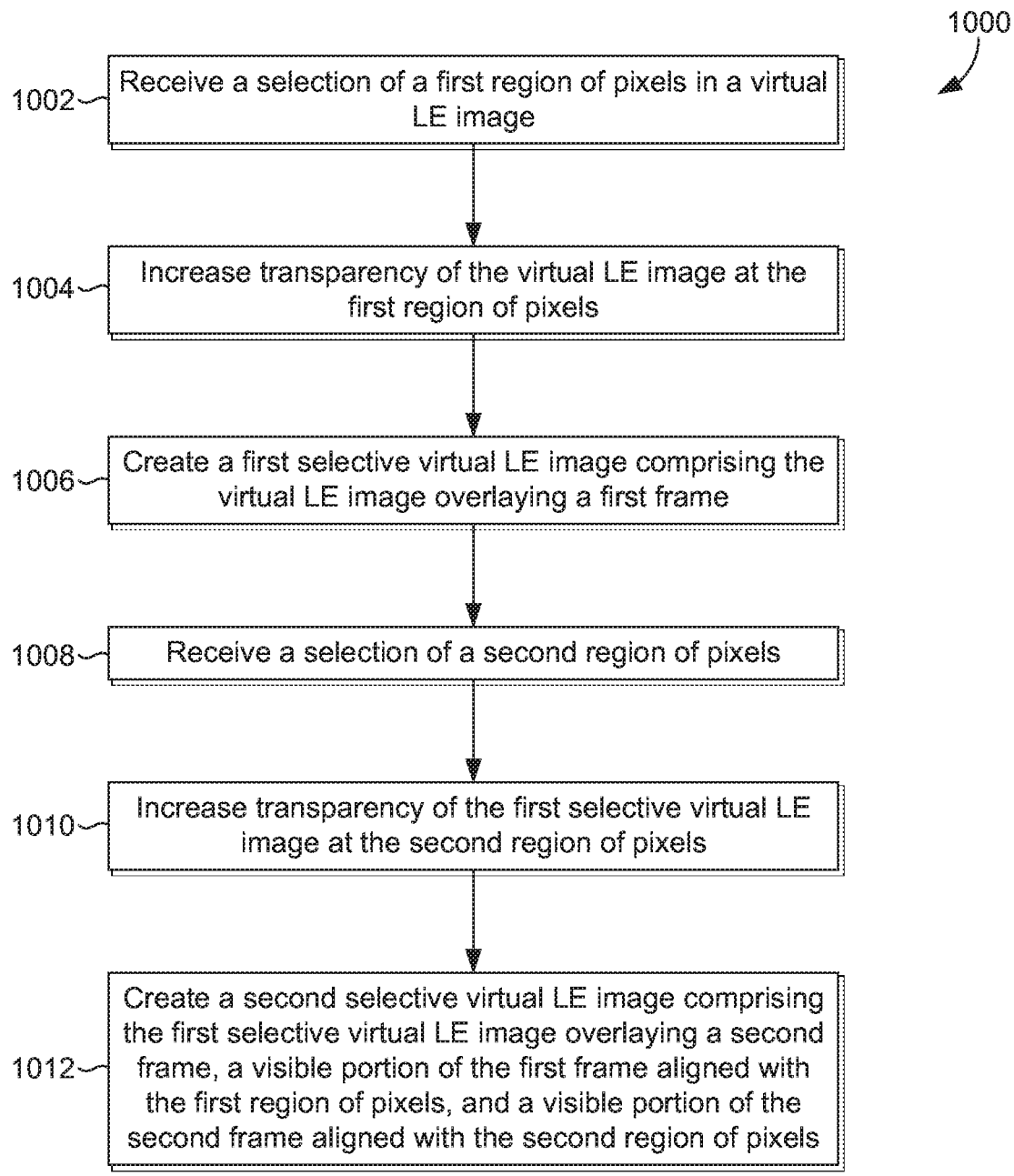

Referring now to FIG. 10, a flow diagram is provided showing one embodiment of a method 1000 creating a selective virtual LE image by replacing multiple regions of the long-exposure image. Initially, at block 1002, a selection of a first region of pixels in a virtual LE image is received, and at block 1004, the transparency of the virtual LE image at the selected first region of pixels is increased. At block 1006, a first selective virtual LE image is created based on the first region of pixels in a similar manner as described with respect to FIG. 9. At block 1008, a selection of a second region of pixels is received. The second region is a different region of pixels than the first selected region. In some aspects, the first selective virtual LE image is kept as a layered image comprising the original virtual LE image overlaying the first frame, and, consequently, the second region of pixels may be selected from the original virtual LE image layer of the first selective virtual LE image. Alternatively, the original virtual LE image and the first frame are merged to form the first selective virtual LE image, and the second region is selected from the single-layered image.

At block 1010, the transparency level of the first selective virtual LE image is increased at the second region of pixels, which may be done in a similar manner as described for the first region of pixels. At block 1012, a second (updated) selective virtual LE image is created by overlaying the first selective virtual LE image, created at block 1008, over a second frame. The second frame may be different than the first frame or may be the same as the first frame. When the particular frame used for the second frame is the same as the particular first frame used for the first selection region, the particular frame may be copied to create a new layer for the second selection region. The second selective virtual LE image may be presented on a user interface. The second selective virtual LE image is presented as a visible portion of the original virtual LE image, a visible portion of the first frame (which is aligned with the first region of pixels), and a visible portion of the second frame (which is aligned with the second region of pixels). The original virtual LE image, the first frame, and the second frame may be left as separate layers to form the second selective virtual LE image or may be merged together.

Exemplary Operating Environment

Figure 11:
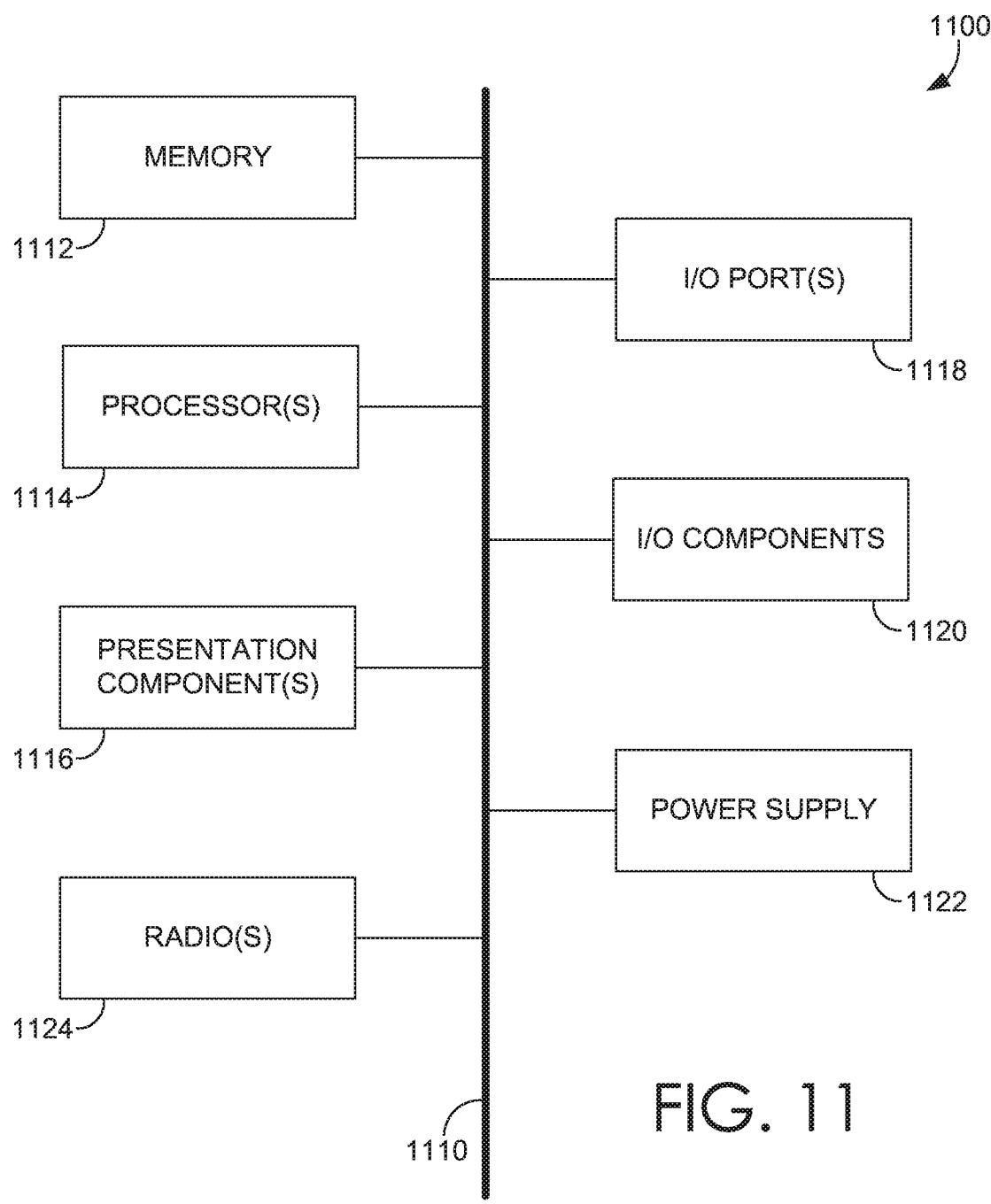
FIG. 11 is a block diagram of an exemplary computing environment suitable for use in implementations of the present disclosure.

Turning now to FIG. 11, FIG. 11 provides a diagram of an exemplary computing environment suitable for use in implementation of the present disclosure. Computing device 1100 includes bus 1110 that directly or indirectly couples the following devices: memory 1112, one or more processors 1114, one or more presentation components 1116, input/output (I/O) ports 1118, input/output components 1120, and illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 11 is merely illustrative of an exemplary computing device that can be used in connection with one or more embodiments of the present invention. Distinction is not made between such categories as "workstation," "server," "laptop," "handheld device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1112 includes computer-storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc. The I/O components 1120 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1100. The computing device 1100 may be equipped with depth cameras, such as stereoscopic camera systems, infrared camera systems, RGB camera systems, and combinations of these, for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

As can be understood, implementations of the present disclosure provide for facilitating creation of selective virtual LE images. The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. A computer system comprising:
a processor; and
a computer storage medium having computer-usable instructions that, when used by the processor, cause the processor to:
receive a selection of a region of pixels in a virtual long-exposure image, the virtual long-exposure image comprising a plurality of aligned frames;
increase a transparency level of the region of pixels in the virtual long-exposure image; and
create a selective virtual long-exposure image comprising the virtual long-exposure image overlaying a frame from the plurality of aligned frames, wherein a portion of the frame corresponding to the regions of pixels is visible through the virtual long-exposure image.

2. The computer system of claim 1, wherein increasing the transparency level of the region of pixels in the virtual long-exposure image comprises adjusting an alpha channel.

3. The computer system of claim 1, wherein the computer-usable instructions further cause the processor to, upon receiving the selection of the region of pixels, perform smoothing to the region of pixels.

4. The computer system of claim 3, wherein smoothing is performed with a kernel size corresponding to a brush size and a sigma corresponding to a brush hardness.

5. The computer system of claim 1, wherein the region of pixels comprises at least a first grouping of pixels and a second grouping of pixels separated from the first grouping by a non-selected grouping of pixels.

6. The computer system of claim 5, wherein the portion of the frame that is visible through the virtual long-exposure image comprises a first portion corresponding to the first grouping of pixels and a second portion corresponding to the second grouping of pixels.

7. One or more non-transitory computer-readable media having a plurality of executable instructions embodied thereon, which, when executed by one or more processors, cause the one or more processors to perform a method comprising:
receiving a selection of at least one region of pixels in a virtual long-exposure image, the virtual long-exposure image comprising a plurality of aligned frames; and
presenting one or more selective virtual long-exposure images on a graphic user interface, each of the one or more selective virtual long-exposure images comprising a visible portion of the virtual long-exposure image and a visible portion of a frame from the plurality of aligned frames, wherein the visible portion of the frame corresponds to the at least one region of pixels.

8. The non-transitory computer-readable media of claim 7, wherein the method further comprises, upon receiving the selection of the at least one region of pixels, automatically performing a smoothing process to the at least one region of pixels.

9. The non-transitory computer-readable media of claim 7, wherein the method further comprises, upon receiving the selection of the at least one region of pixels, automatically increasing a transparency level for each region of pixels selected from the virtual long-exposure image.

10. The non-transitory computer-readable media of claim 9, wherein the method further comprises creating a plurality of selective virtual long-exposure images that each correspond to a different frame from the plurality of aligned frames.

11. The non-transitory computer-readable media of claim 10, wherein presenting the one or more selective virtual long-exposure images on the graphic user interface comprises presenting each selective virtual long-exposure image from the plurality of selective virtual long-exposure images individually on the graphic user interface.

12. The non-transitory computer-readable media of claim 11, wherein the method further comprises receiving a current position of a slider object on the graphic user interface and wherein the selective virtual long-exposure image being presented corresponds to the current position of the slider object.

13. The non-transitory computer-readable media of claim 10, wherein the method further comprises receiving a selection of a particular selective virtual long-exposure image from the plurality of selective virtual long-exposure images.

14. The non-transitory computer-readable media of claim 13, wherein the method further comprises, upon receiving the selection of the particular selective virtual long-exposure image, flattening the particular selective virtual long-exposure image into a single-layered image.

15. A system comprising:
- a means for providing a virtual long-exposure image having one or more blurred regions; and
- a means for creating a selective virtual long-exposure image from the virtual long-exposure image, the selective virtual long-exposure image comprising a first portion of the one or more blurred regions in the virtual long exposure image and further comprising a non-blurred region replacing a second portion of the one or more blurred regions.

16. The system of claim 15, wherein providing the virtual long-exposure image comprises aggregating a plurality of short-exposure frames into a stack and aligning the short-exposure frames based on similarity of background pixels at each pixel location within the stack, wherein the one or more blurred regions result from aggregating the plurality of short-exposure frames.

17. The system of claim 16, wherein creating the selective virtual long-exposure image comprises:
- receiving a selection of a first region of pixels in the virtual long-exposure image, the first region of pixels encompassing the second portion of the one or more blurred regions;
- increasing a transparency level of the virtual long-exposure image at the first region of pixels; and
- arranging the virtual long-exposure image to overlay a first frame from the plurality of short-exposure frames, wherein the non-blurred region of the selective virtual long-exposure image corresponds to the first region pixels selected from the virtual long-exposure image and wherein the first frame forms the non-blurred region.

18. The system of claim 17, wherein creating the selective virtual long-exposure image further comprises presenting the selective virtual long-exposure image on a graphic user interface such that a portion of the first frame corresponding to the first region of pixels is visible through the first region of pixels of the virtual long-exposure image.

19. The system of claim 17, wherein creating the selective virtual long-exposure image further comprises updating the selective virtual long-exposure image by:
- receiving a selection of a second region of pixels, the second region of pixels being different from the first region of pixels and encompassing a third portion of the one or more blurred regions;
- increasing a transparency level of the selective virtual long-exposure image at the second region of pixels; and
- arranging the selective virtual long-exposure image to overlay a second frame from the plurality of short-exposure frames,
- wherein the second frame forms a second non-blurred region of an updated selective virtual long-exposure image corresponding to the second region of pixels selected.

20. The system of claim 18, wherein the selective virtual long-exposure image comprises a virtual long-exposure image layer, a first frame layer, and a second frame layer, and wherein increasing the transparency level of the selective virtual long-exposure image at the second region of pixels comprises increasing a transparency level of the virtual long-exposure image layer and increasing a transparency level of the first frame layer.

* * * * *